Jan. 15, 1963  D. W. DUNNING  3,073,322
SINGLE CONVEYOR RETURN TYPE PLATING MACHINE
Filed Sept. 25, 1959  6 Sheets-Sheet 1
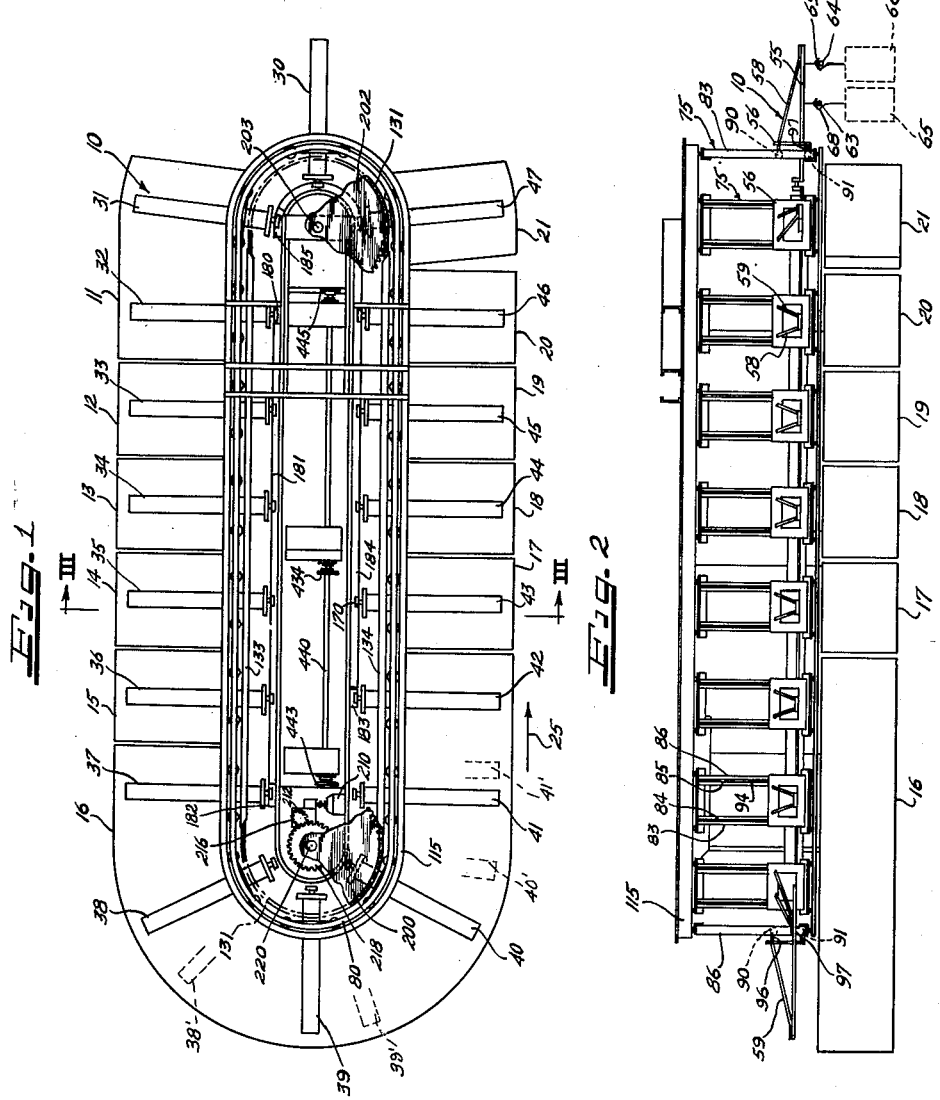
Inventor
DAVID W. DUNNING
Hill, Sherman, Meroni, Gross & Simpson
by
Attys.

Jan. 15, 1963  D. W. DUNNING  3,073,322
SINGLE CONVEYOR RETURN TYPE PLATING MACHINE
Filed Sept. 25, 1959  6 Sheets-Sheet 2
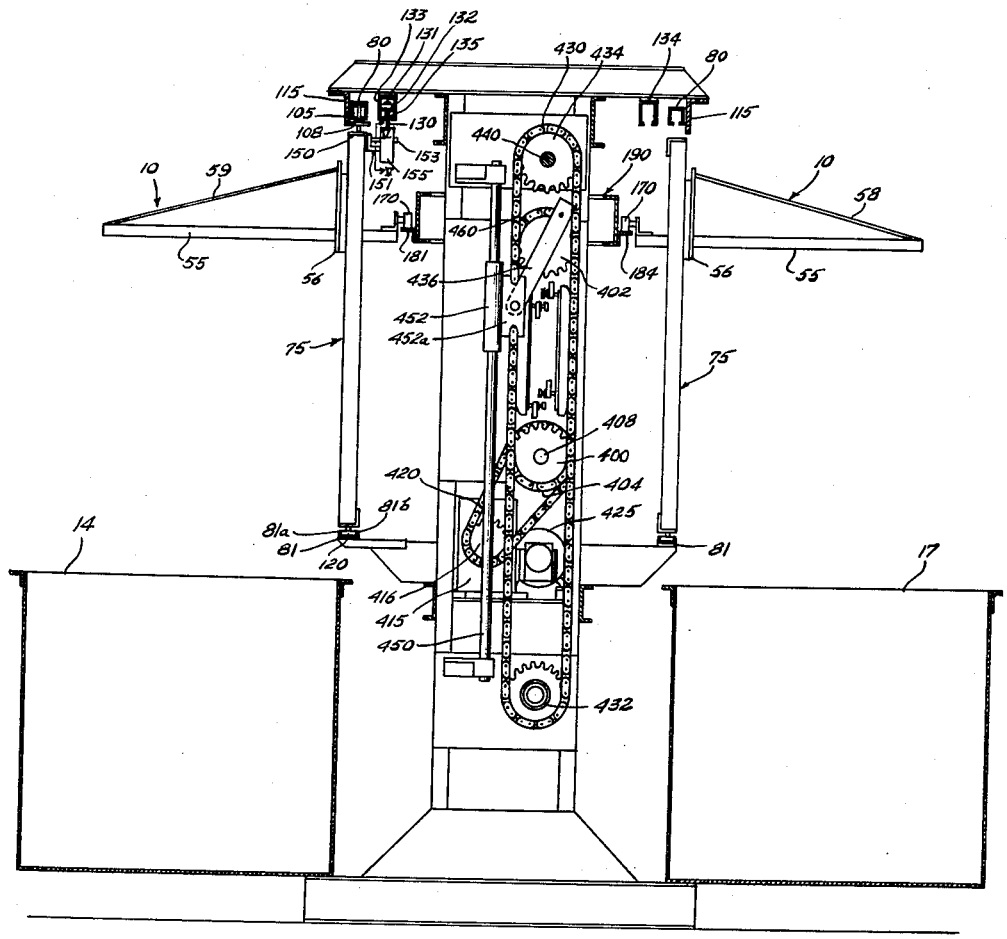
Inventor
DAVID W. DUNNING
by Hill, Sherman, Meroni, Gross & Simpson
Attys.

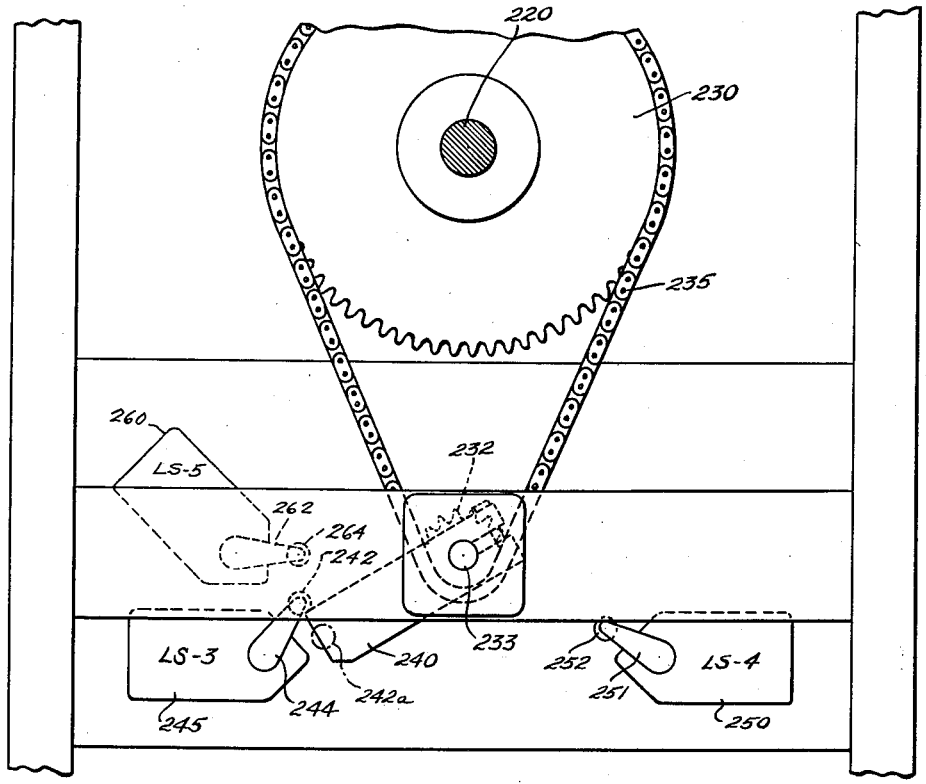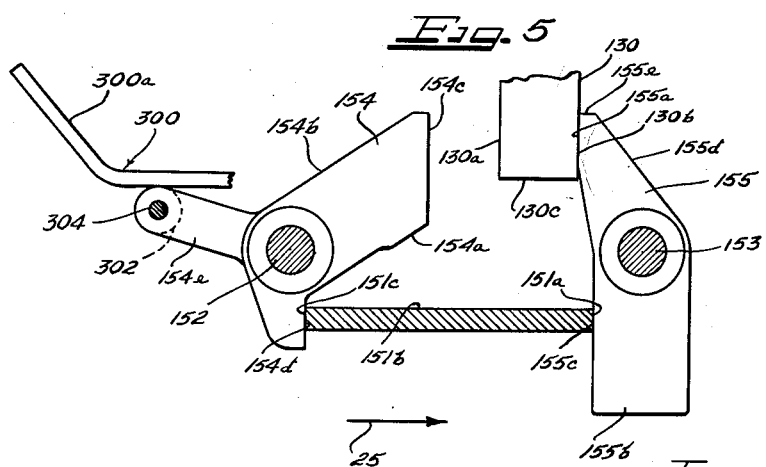

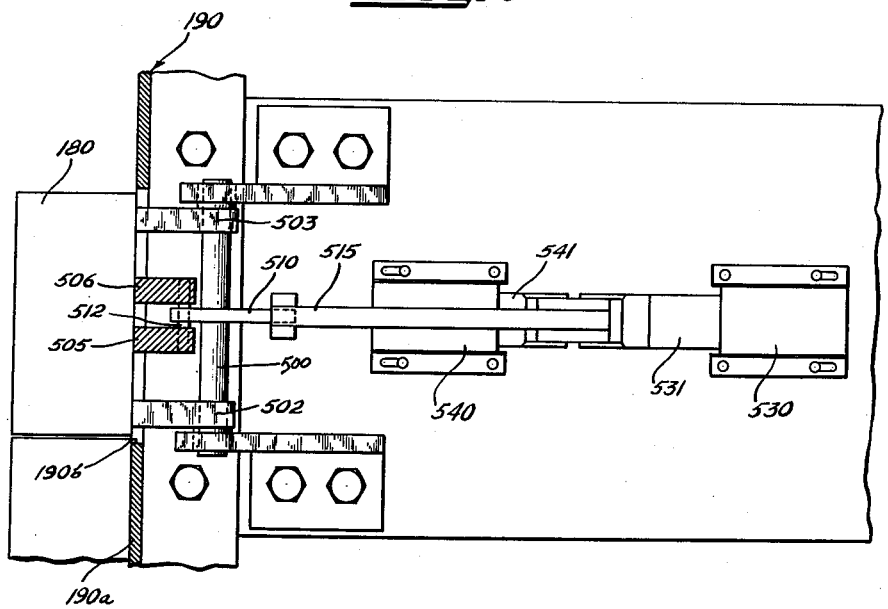
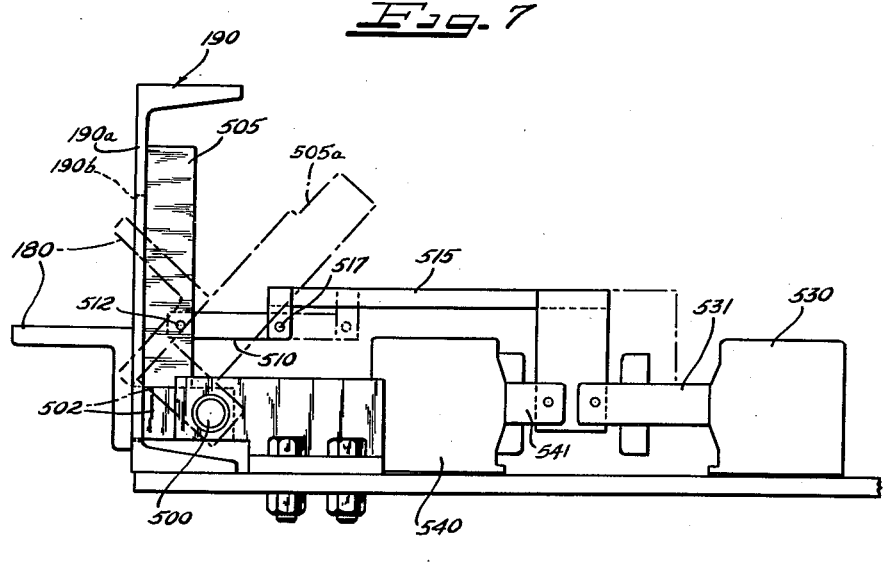

Jan. 15, 1963    D. W. DUNNING    3,073,322
SINGLE CONVEYOR RETURN TYPE PLATING MACHINE
Filed Sept. 25, 1959    6 Sheets-Sheet 5

Inventor
DAVID W. DUNNING
by Hill, Sherman, Meroni, Gross & Simpson
Attys.

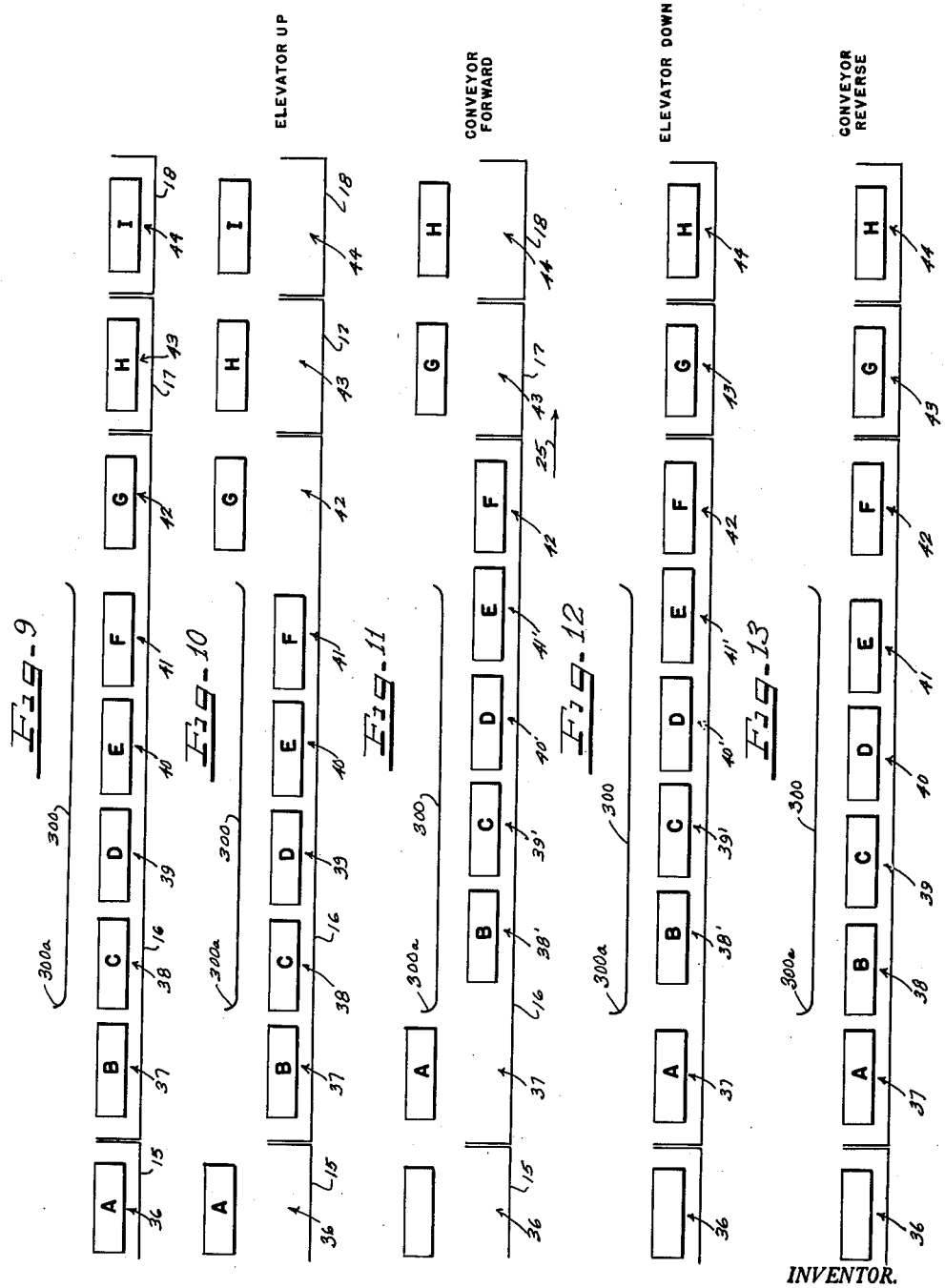

3,073,322
SINGLE CONVEYOR RETURN TYPE PLATING MACHINE

David W. Dunning, La Grange, Ill., assignor to The Meaker Company, Chicago, Ill., a corporation of Illinois Filed Sept. 25, 1959, Ser. No. 842,437
6 Claims. (Cl. 134—58)

This invention relates to a processing machine and particularly to such a machine wherein work carriers are moved partially in a forward direction and partially in a reverse direction in each cycle of movement.

It is an important object of the present invention to provide a novel processing machine wherein work carriers are moved a first greater distance in the forward direction and are then moved a lesser direction in the reverse direction to compress the spacing of the work carriers at certain portions of the machine.

Another object of the invention is to provide a novel control circuit for a processing machine providing a novel movement of work carriers through the machine.

A more specific object of the present invention resides in the concept of providing freely movable carrier guide frames for movement in a loop path about a processing machine wherein certain of the carrier guide frames may be moved horizontally relative to other of the carrier guide frames and wherein work carriers are movable vertically in the carrier guide frames in transfer between successive stations of the machine.

Other important objects, features and advantages of the present invention will be apparent from the following detailed description taken in connection with the accompanying drawings, in which:

FIGURE 1 is a diagrammatic plan view of a processing machine in accordance with the present invention;

FIGURE 2 is a somewhat diagrammatic side elevational view of the machine of FIGURE 1;

FIGURE 3 is a somewhat diagrammatic vertical cross-sectional view taken generally along the line III—III of FIGURE 1;

FIGURE 4 is a fragmentary somewhat diagrammatic top plan view illustrating the mechanism for controlling movement of the horizontal conveyor chain of the embodiment of FIGURES 1–3;

FIGURE 5 is a fragmentary somewhat diagrammatic vertical sectional view of the forward and reverse latching lugs of a carrier guide frame, the view being taken along the line shown at V in FIGURE 3 looking in the direction of the arrow;

FIGURE 6 is a fragmentary somewhat diagrammatic horizontal sectional view illustrating certain parts in top plan and illustrating the mechanism for moving the movable elevator rail sections between operative and inoperative positions;

FIGURE 7 is a fragmentary side elevational view of the structure of FIGURE 6;

Figure 8:
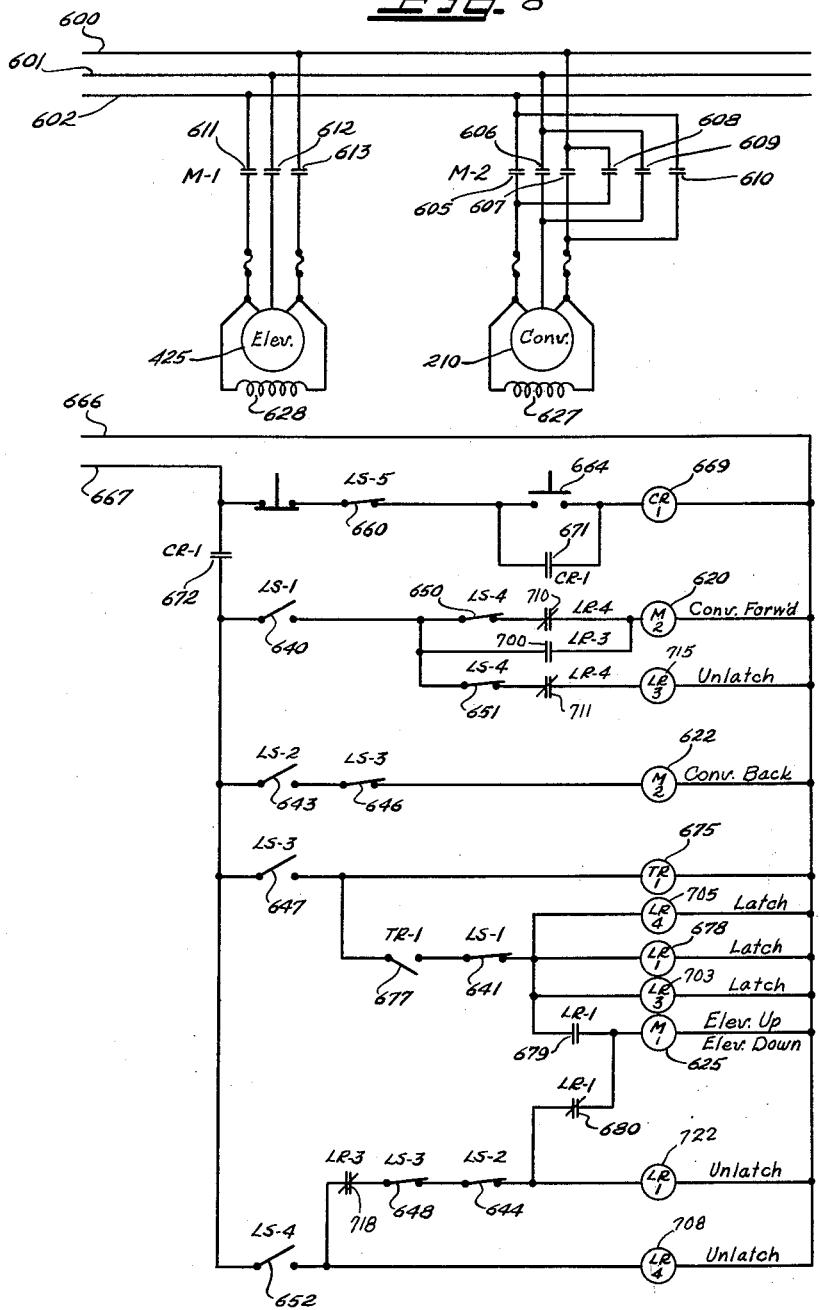
FIGURE 8 is a diagrammatic illustration of an electric control circuit for the machine of FIGURES 1 through 7.

FIGURES 9 through 13 illustrate diagrammatically the various movements of the work units adjacent the tank 16 of FIGURES 1 and 2.

As shown on the drawings:

FIGURE 1 illustrates the general layout of a processing machine in accordance with the present invention. The machine may be operative to move work units suspended from work carriers 10 through a series of processing tanks designated by the reference numerals 11 through 21 in the direction of the arrow 25. By way of example, tank 11 may have an electrocleaning function, tank 12 may provide a cold rinse, tank 13 an acid dip, tank 14 a cold rinse, tank 15 a cyanide dip, tank 16 may contain a zinc plating solution, tank 17 may provide a cold rinse, tank 18 a cold rinse, tank 19 a bright dip, tank 20 a cold rinse and tank 21 a hot rinse. For convenience of reference, the work carrier stop positions have been assigned reference numerals 30–47. As seen in FIGURE 2, each work carrier 10 may comprise a generally horizontally extending arm 55 secured to an open rectangular frame 56. Braces 58 and 59 are indicated as being secured at their upper ends to the open frame 56 and at their lower ends to the outer end of the arm 55 to provide rigid support therefor. As indicated in FIGURE 2, the arm 55 may carry work supporting rods 63 and 64, and work units such as indicated at 65 and 66 may have hooks 68 and 69 engaging over the supports 63 and 64 to support the work units from the carrier 10.

Each work carrier 10 is mounted for vertical reciprocation with respect to a carrier guide frame 75 which is mounted for movement about the machine by means of upper and lower tracks 80 and 81, FIGURE 3, extending continuously in a closed loop at the inner side of the series of tanks. The carrier guide frames may each comprise cooperating sets of vertical channels 83, 84 and 85, 86 facing each other to define vertical trackways for rollers such as indicated at 90 and 91 at the left in FIGURE 2. The rollers such as 90 and 91 are confined to the interior of the guideways defined by the channels such as 85 and 86 by means of the confronting flanges on the channels. The edges of the confronting flanges of the channels such as 85 and 86 are spaced at the front side of the guide frame to define a vertical slot 94 through which the mounting plates such as 96 and 97 for the rollers 90 and 91 extend. The work carriers 10 are thus free to move between a lower position such as illustrated in FIGURE 2 and an upper position such as illustrated in FIGURE 3. As seen in FIGURE 3, the carrier guide frames 75 have rollers such as 105 rotatable on a horizontal axis and riding in the trackway 80 and have rollers such as indicated at 108 rotatable on a vertical axis and engageable for riding against the side plate 115, FIGURE 3. It will be understood that the side plate 115 may extend continuously about the loop path of the carrier guide frames. At its lower end, each carrier guide frame has rollers such as 120, FIGURE 3, riding between the front and rear vertical flanges 81a and 81b of the track 81 to control the lateral position of the lower end of the carrier guide frame. As seen at the left in FIGURE 3, rollers such as 108 bearing against the side plate 115 serve to oppose the turning moment exerted on the carrier guide frame 75 by the work load on the work carrier.

The carrier guide frames 75 are adapted to be propelled in the forward direction by a series of pusher lugs such as indicate at 130, FIGURE 3, carried by a chain 131 having rollers 132 guiding the chain for movement along chain guide tracks 133 and 134 extending on opposite sides of the machine. By way of example, the pushers 130 may be spaced a distance of four inches apart about the entire length of the upper conveyor chain loop. Alternate pushers 130 may carry rollers such as indicated at 135 in FIGURE 3 which ride on the lower flanges of chain guide tracks 133 and 134 and are rotatable on horizontal axes. The chain 131 may have a four inch pitch with rollers 132 mounted centrally on the vertical pins connecting the successive links of the chain. The pushers such as indicated at 130 may be rigidly secured to the links intermediate the vertical pins connecting the successive links. The rollers 132 on the vertical pins of the chain thus ride on the side walls of the chain guide tracks 133 and 134.

As seen in FIGURE 3 at the left, the carrier guide frames 75 each have an angle bracket 150 extending across the top thereof to which is secured a bracket plate 151. The plate 151 carries a pair of horizontal shafts 152 and 153, FIGURE 5, which carry latching lugs 154 and 155. As seen at the left in FIGURE 3, the pusher elements 130 are in alignment with these lugs and are operative to advance the carrier frames 75 along their tracks in the direction of arrow 25, FIGURE 5, by engagement with the front lugs 155.

It will be observed from FIGURE 3 that the carrier assemblies 10 carry rollers 170 at the inner ends of the horizontal frame members 55. These rollers 170 are adapted to be engaged by elevator rail sections such as indicated at 180—185 in FIGURE 1 on the elevator frame 190, FIGURE 3.

When the elevator frame 190 is in upper position as shown in FIGURE 3, work carriers at positions 30, 32, 33, 34, 35, 36, 42, 43, 44, 45, 46 and 47 may be raised to upper position by engagement of the rollers 170 with track sections 180, 181, 183 and 184. At this upper position of the work carriers, the work units such as 65 and 66, FIGURE 2, are above the tanks 11–21 so as to be adapted to be horizontally transferred across the end walls of the tanks. With the elevator frame in the upper position, the upper conveyor chain 131 is advanced the carrier transfer distance which is equal to the spacing between successive work carriers and which may be three feet in the illustrated exemplary embodiment.

The chain conveyor 131 may be driven by means of a sprocket wheel indicated at 200 having for example 40 teeth on a four inch pitch to engage between the successive rollers 132 on the chain. The teeth on the sprocket wheel serve to guide the chain about an arcuate path at the end of the machine, so that the chain guide tracks 133 and 134 terminate in spaced relation to the sprocket 200 as indicated in FIGURE 1. Similarly at the opposite end of the machine an idler sprocket wheel 202 is mounted on a shaft 203 to guide the upper conveyor chain at this end of the machine. The drive for the sprocket wheel 200 may be positioned at any convenient location. If head room permits, the drive may be and preferably is disposed at the level above the sprocket wheel 200. On the other hand, to save head room, the drive for the sprocket 200 may comprise a motor 210 mounted centrally of the framework as indicated in FIGURE 1 generally at the level of the tanks such as 16. The motor may drive a suitable reducer mechanism 212 and the output of the reducer may be connected to a spur gear 216 driving a larger diameter spur gear 218 fixed to a vertical shaft 220 which carries the sprocket gear 200 at its upper end.

For indexing movements of the conveyor chain, a sprocket wheel 230, FIGURE 4, may be secured to the vertical shaft 220 at a convenient height and this sprocket 230 may be coupled to a smaller sprocket 232 mounted on a shaft 233 by means of a sprocket chain indicated at 235. A limit switch actuating arm 240 may be secured to the vertical shaft 233 above the sprocket wheel 232 and may be disposed to engage a roller 242 on the end of a limit switch actuating arm 244 of a conveyor back limit switch 245. A second conveyor forward limit switch assembly 250 has an actuating arm 251 carrying a roller 252 which is also in the path of the actuating arm 240 as the same rotates with shaft 233. The limit switch 245 is so constructed that the switch element associated therewith is actuated only as the actuator arm 240 moves in the clockwise direction corresponding to reverse movement of conveyor chain 131.

A further limit switch 260 is disposed adjacent the limit switch 245 and has an actuating arm 262 with a roller 264 disposed in the path of travel of the actuating arm 240 on shaft 233. The limit switch 260 acts as a safety limit switch during reverse rotation of the shaft 220 to stop such reverse rotation if limit switch 245 fails to function to stop reverse movement of the conveyor.

When the conveyor is advanced in the forward direction shaft 233 is rotated in the counterclockwise direction and actuates limit switch 250 twice during the time the upper conveyor chain is moved a full transfer distance which may be three feet, for example. After the elevator frame has been lowered, the upper conveyor is indexed in the reverse direction for a purpose to be hereinafter described, causing rotation of the shaft 233 in the clockwise direction until the actuator arm 240 actuates limit switch 245 to interrupt the reverse cycle. When the limit switch 245 is in actuated condition, the roller 242 assumes the position indicated in FIGURE 4. Spring means normally center the limit switch actuating arm roller 242 at the position shown at 242a in FIGURE 4 in the path of travel of the actuating arm 240, and similar spring means normally position rollers 252 and 264 as shown in FIGURE 4. When the rollers 242 and 264 are moved to extreme counterclockwise positions and when roller 252 is moved to an extreme clockwise position, the switches actuate respective pairs of contacts to control the movement of the conveyor. The angular distance travelled by the actuator arm 240 between the position shown in FIGURE 4 and the position in which the roller 252 assumes actuated condition plus the angular distance corresponding to one complete revolution of arm 240 corresponds to movement of the upper conveyor chain 131 the transfer distance between successive tanks such as 12–15, for example.

FIGURE 5 illustrates the details of the latching lugs 154 and 155 mounted on the pins 152 and 153 of each carrier frame 75. The forward latching lug 155 has a chain pusher 130 engaging surface 155a which is normally disposed in a vertical plane and held in this position by a counterweight section 155b of the lug. A face 155c of the counterweight section 155b engages end 151a of a notch in the mounting bracket angle 151. The chain pusher lug 130 engages the face 155a to advance the carrier guide frame with the chain in the forward direction of travel of the carrier guide frames about the machine. It will be understood that the carrier guide frame may be engaged with a pusher 130 in advance of the latch lugs 154 and 155 thereof by moving the carrier frame along its guide tracks until the sloping surface 155d engages the rear face 130a of the pusher 130 causing the lug 155 to pivot in the counterclockwise direction about shaft 153 until the pusher 130 clears the top edge face 155e of the lug, whereupon the lug will return to its normal operative position as a result of the action of gravity on the counterweight portion 155b of the lug. If the pusher 130 is now moved in the forward direction, the front face 130b of the pusher engages the confronting face 155a of the lug 155 to advance the carrier, the face 155c of the lug 155 engaging the end 151a of the notch in the bracket 151 to prevent clockwise rotation of the lug 155 on its shaft 153.

The reverse latching lug 154 is normally in an inactive position with stop face 154a resting against the top surface 151b of bracket 151 and top edge 154b in a generally horizontal disposition below the level of the bottom edge 130c of the chain pusher 130. The reverse lug 154 normally assumes this position because of the greater mass of the lug at the right-hand side of the pin 152 as viewed in FIGURE 5. If the chain conveyor is moved in the reverse direction with the reverse lug in its normal inactive position, the pusher 130 associated with the illustrated carrier in FIGURE 5 will simply move in the reverse direction without moving the carrier guide frame and will move into engagement with the carrier frame behind the carrier frame illustrated in FIGURE 5 by rocking the leading latching lug corresponding to lug 155 in the counterclockwise direction as previously described.

On the other hand, if the reverse lug 154 is held in the operative position as shown in FIGURE 5 by means of a suitable control bar such as shown at 300 in FIGURE 5, the pusher engaging face 154c will be in the operative position to engage the rear face 130a of the chain pusher 130 as the chain is moved in the reverse direction. The reverse latch 154 is prevented from counterclockwise rotation by engagement of a stop face 154d with an end wall 151c of a notch in bracket 151. The control bar 300 coacts with a pin 302 having its reduced shaft portion 304 secured to an extension 154e on the reverse lug 154.

A control bar such as indicated at 300 in FIGURE 5 may activate the reverse lugs 154 on the carriers at positions 38, 39, 40 and 41, FIGURE 1. If this is the desired operation, the bar 300 will be provided with an upwardly inclined end portion 300a, FIGURE 5, disposed immediately beyond carrier position 37 so that as a carrier frame is moved from position 37 to a position 38' beyond position 38, reverse lug 154 thereof will be moved from the normal inactive position to the active position shown in FIGURE 5.

By way of example, the spacing between carrier positions 41 and 42 may be three feet, the spacing between carrier positions 37 and 38, 38 and 39, 39 and 40, and 40 and 41 may be two feet four inches, and the spacing between carrier positions 37 and 38' may be three feet. In this case, when the upper chain conveyor is advanced a distance of three feet, the carrier originally at position 37 will reach position 38', the carrier originally at position 38 will reach position 39', the carrier originally at position 39 will reach position 40', the carrier originally at position 40 will reach position 41', and the carrier originally at position 41 will move to position 42. The carriers which are now beyond positions 38, 39, 40 and 41 will have their reverse latches 154 held in operative position by means of the control bar 300, so that when the chain conveyor is moved in the reverse direction a distance of eight inches the carriers at positions 38', 39', 40' and 41' will be moved back to positions 38, 39, 40 and 41, respectively. Throughout the remainder of the length of the machine, the reverse lugs 154 will be in inactive position during the reverse movement of the chain, so that if the pushers on the chain are on four inch centers, one pusher will travel past the forward lug 155 of each stationary carrier guide frame deflecting it in the counterclockwise direction (FIGURE 5), and a second pusher will move past the same forward latching lug 155 deflecting the same out of operative position momentarily and will move past the latching lug to allow the same to return to its operative position in front of this second chain pusher in preparation for a further advance of the chain.

As illustrated in FIGURE 3, the elevator drive mechanism for raising and lowering the elevator frame 190 may comprise a lower drive sprocket wheel 400 and an upper drive sprocket wheel 402 connected by a chain 404. The lower drive sprocket wheel 400 is driven by means of a drive sprocket wheel on a common shaft 408 with the sprocket wheel 400, the drive sprocket wheel on shaft 408 being driven from a speed reducer 415 through a sprocket wheel 416 and sprocket chain 420. An electric motor 425 drives the reducer mechanism 415. The chain 404 is coupled to a longer chain 430 extending over a lower sprocket 432 and an upper sprocket 434 by means of an arm indicated at 436. The upper sprocket 434 is secured to a line shaft 440. Sprocket wheels 443 and 445 seen in FIGURE 1 may be secured to the ends of the horizontal line shaft 440 to drive chain loops similar to chain loop 430 which are secured to the elevator frame 190.

By way of example as illustrated in FIGURE 3, vertical shafts such as indicated at 450 may be disposed adjacent the elevator drive chain loops associated with the sprockets 434, 443 and 445 and each may have a sleeve 452 slidably carried thereon and secured to the corresponding elevator drive chain such as 430. By way of example, the elevator drive link arm 436 may be pivotally secured to a flange 452a on sleeve 452 and the chain 430 may have opposite ends secured to the top and bottom of flange 452a respectively so that as the end of link arm 436 which is secured to drive chain 404 travels in a loop path with the chain 404, the sleeve 452 will reciprocate vertically on the shaft 450 to reciprocate the elevator frame 190. It will be understood that the chain 430 and the corresponding chains at the respective ends of the machine may be secured to the elevator frame 190 at positions such as indicated generally at 460 in FIGURE 3.

In the preferred cycle of operation, the upper conveyor is advanced in the forward direction only when the frame 190 is in upper position. Accordingly, it is necessary that when the elevator frame is in down position and about to be raised, elevator rail sections 182 and 185, FIGURE 1, be out of operative relation to the rollers 170 on the adjacent work carriers as illustrated in dot dash outline in FIGURE 7 for rail section 180. Elevator rail sections 180 and 183 must be in the operative position as the elevator frame is raised, corresponding to the position of the rail sections 181 and 184 shown in FIGURE 3. Under these circumstances when the elevator is raised, the work carriers at positions 32 and 42 will be raised while the work carriers at positions 31 and 37 will remain in lower position with their work in tanks 11 and 16. In the lower position of the work carriers the horizontal member 55 of each work carrier rests upon an angle bar of the carrier guide frame 75 to support the work carrier. The elevator rail sections 180-185 of the elevator frame 190 are disposed several inches below the work carrier rollers 170 in lower position of the elevator frame to accommodate pivotal movement of sections 180, 182, 183 and 185 as shown for section 180 in FIGURE 7.

While the elevator frame is in elevated position, all of the work carriers are advanced so that the work carriers at positions 31 and 37 are advanced to positions 32 and 38, respectively, while the work carrier at position 41 is moved to position 42. Thus the elevator rail sections 180 and 183 must be in an inoperative position clear of the rollers 170 of the work carriers at stations 32 and 42 as the elevator frame returns to lower position, and the elevator rail sections 180 and 183 must be pivoted to operative position after the elevator frame reaches a position below the work carriers at these positions.

By way of example, the pivotal track sections 180, 182, 183 and 185 may be pivotally mounted by means of pivot shafts such as 500, FIGURES 6 and 7, on the elevator frame 190. The elevator frame may comprise an angle bar indicated at 190a having a slot 190b therein of size to receive the elevator rail section 180, FIGURES 6 and 7, as the elevator rail section pivots to inoperative position. The elevator rail section 180 may have a pair of arms 502 and 503 secured thereto and pivotally carried on the shaft 500. A pair of vertical plates 505 and 506 may be secured at their lower ends to the rail section 180 and may be notched at their upper ends as indicated at 505a to extend above the top of the slot 190b so as to limit pivotal movement of the rail section 180 in the counterclockwise direction. A link 510 may be pivotally secured between the vertical plates 505 and 506 by means of a pin 512, and the link 510 may be secured to a solenoid arm 515 by means of a pin 517 so that as the arm 515 is retracted by means of the solenoid 530 through its armature 531, the rail section 180 is pivoted to the inoperative position. The solenoids such as 530 may be controlled by suitable limit switches so that the solenoids corresponding to 530 for rail sections 180 and 183 are energized when the elevator frame begins to be lowered, and so that an oppositely acting solenoid such as 540 having an armature 541 connected to the solenoid arm 515 is energized each time the elevator frame reaches lower position. The elevator rail section actuating mechanism may have sufficient friction, so that the elevator rail section 180, for example, will be maintained in either of its two extreme positions, whereby the solenoids such as 530 and 540 need only be energized for a sufficient time period to insure shifting of the elevator rail sections from one position to the other at the proper times.

For the elevator rail sections 182 and 185, a solenoid corresponding to 530 in FIGURE 7 is energized each time the elevator frame reaches lower position and a solenoid corresponding to 540 is energized each time the elevator frame approaches upper position.

Of course, suitable mechanical devices may be provided for camming the elevator track sections into and out of active position at the desired times in place of the electrical mechanism illustrated, and suitable safety limit switches may be provided to prevent further operation of the machine if the rail sections are not properly positioned.

FIGURE 8 illustrates schematically a suitable electric circuit for the illustrated machine. A 440 volt, 60 cycle, three phase supply may be connected to lines 600, 601 and 602. Power is supplied to conveyor chain drive motor 210 and elevator motor 425 under the control of contacts 605, 606, 607 or 608, 609 and 610, and contacts 611, 612 and 613, respectively. Conveyor forward contacts 605–607 are controlled by coil 620 of conveyor motor relay M–2 while conveyor reverse contacts 608–610 are controlled by reverse coil 622 of the conveyor motor relay M–2. Elevator motor contacts 611–613 are controlled by coil 625 of elevator motor relay M–1. Brakes are provided for the conveyor and elevator motor shafts which are automatically applied when solenoids 627 and 628 associated with the motors 210 and 425 are deenergized.

Limit switches are provided having the following functions:

LS–1 elevator upper limit switch closes contact 640 and opens contact 641 when the elevator reaches upper position.

LS–2 elevator lower limit switch closes contact 643 and opens contact 644 when the elevator reaches lower position.

LS–3 conveyor back limit switch opens contacts 646 and 648 and closes contact 647 when the conveyor moves in the reverse direction to a "back" position. This limit switch is indicated at 245 in FIGURE 4 and is actuated only as the chain moves in the reverse direction to move the arm 240 in the clockwise direction.

LS–4 conveyor forward limit switch when actuated opens contacts 650 and 651 and closes contacts 652 in FIGURE 8. This limit switch is shown at 250 in FIGURE 4 and is actuated twice each time the conveyor moves forward a full stroke corresponding to rotation of the arm 240 in the counterclockwise direction through 360° plus the smaller angular distance between the position of limit switches 245 and 250.

LS–5 conveyor back safety limit switch opens contact 660 when actuated. This limit switch is shown at 260 in FIGURE 4 and is actuated only by overtravel of the arm 240 in the clockwise direction which occurs only when the limit switch 245 (LS–3) fails to function.

Various other safety limit switches may be provided in series with contact 660 of limit switch LS–5 to control proper operation of the conveyor and elevator as is well understood in the art.

When start button 664 is depressed 110 volt, 60 cycle voltage is supplied from lines 666 and 667 across coil 669 of relay CR1 to close contacts 671 and 672. Assuming the elevator to be in down position and the chain conveyor to be in a "back" position, actuating arm 240 in FIGURE 4 will be holding limit switch arm 244 of limit switch LS3 in its position indicated in FIGURE 4 to hold contacts 646 and 648 open and contact 647 closed, energizing coil 675 of timing relay TR–1. When timing relay TR–1 times out, contact 677 is closed.

When timer TR–1 times out and contact 677 is closed, latch coil 678 of relay LR1 is energized and coil 625 of motor control relay M1 is then energized to close contacts 611–613 and energize motor 425 to raise the elevator frame and elevate the work carriers to be transferred over the ends of the respective tanks.

When the elevator reaches upper position, contact 641 of limit switch LS–1 is opened to deenergize coil 625 of relay M1, opening contacts 611–613 to deenergize elevator motor 425 and deenergize solenoid 628 to apply the elevator brake.

Actuation of limit switch LS–1 closes contact 640.

Conveyor motor forward coil 620 of relay M–2 is now energized to close contacts 605–607 and energize the motor 210 in the forward direction causing the chain conveyor 131 to advance. As the conveyor 131 moves in the forward direction, actuating arm 240 of FIGURE 4 moves in the counterclockwise direction from the position shown in FIGURE 4 past the limit switch 250 (LS–4) actuating this limit switch. Actuation of limit switch LS–4 opens contacts 650 and 651 momentarily, but does not discontinue energization of the conveyor motor 210 since latching relay LR–3 remains latched to maintain its normally open contacts 700 closed. It will be noted that latching coils 678, 703 and 705 of latching relays LR–1, LR–3 and LR–4 were energized through contacts 677 of timing relay TR–1 at the time when coil 625 of the elevator relay M1 was energized. When limit switch LS–4 is actuated, contact 652 is momentarily closed to momentarily energize unlatch coil 708 of latching relay LR–4 to unlatch this relay and close its normally closed contacts 710 and 711. When the actuating arm 240 moves past arm 251 of limit switch LS–4 in FIGURE 4, contacts 650 and 651 again close, and contact 651 causes energization of unlatch coil 715 of latching relay LR–3 to open contacts 700 and close contacts 718 thereof. As the actuating arm 240 continues its counterclockwise movement, its actuation of arm 244 of limit switch LS–3 is in the wrong direction to cause any actuation of the switch contacts associated therewith, however, engagement of actuating arm 240 with the limit switch LS–4 for the second time causes opening of contacts 650 and 651 and opening of contact 650 causes deenergization of the forward coil 620 of the conveyor motor to stop forward movement of the conveyor.

When contact 652 of limit switch LS–4 again closes, since relay LR–3 is unlatched, unlatch coil 722 of relay LR–1 is energized to close contacts 680 and open contacts 679, energizing relay coil 625 of relay M–1 to energize the elevator motor 425. When the elevator reaches down position, limit switch contact 644 of limit switch LS–2 opens to deenergize coil 625 and stop the elevator motor 425. Contact 643 of limit switch LS–2 closes to energize conveyor back coil 622 of conveyor relay M–2 moving the conveyor in the reverse direction until the actuating arm 240 actuates limit switch LS–3 opening contact 646 and closing contact 647 to begin a new cycle.

*Summary of Operation*

Thus, in operation of the illustrated embodiment, with the work carriers in down position as shown in FIGURES 2 and 9, movable elevator rail sections 180 and 183 will be in the operative position corresponding to the position of elevator rail section 180 shown in FIGURE 7. Elevator rail sections 182 and 185 will be in the inoperative position corresponding to the dot dash position of rail section 180 shown in FIGURE 7. As the elevator frame 190 is raised to upper position as seen in FIGURES 3 and 10, work carriers in front of respective tank ends such as those carrying work units designated A, G, H and I in FIGURE 10 will be raised for transfer of the work units to the respective next treatment stations. Work units at positions 31, 37, 38, 39, 40 and 41 including work units indicated at B through F in FIGURE 10 will remain in the lower position seen in FIGURE 2.

With the elevator in upper position, the chain conveyor seen at 131 in FIGURES 1 and 3 is advanced the transfer distance to place work units such as designated A through H in the positions shown in FIGURE 11, and the elevator is lowered to the down position to place work units such as indicated at A, G and H at work positions 37, 43 and 44 as indicated in FIGURE 12. Thereafter, the chain conveyor 131 is moved in the reverse direction a distance equal to a fraction of the transfer distance. Referring to FIGURES 1 and 11, during the advance of the conveyor 131, work units such as designated by letters B through F in FIGURES 10 and 11 are moved to positions 38′, 39′, 40′, 41′ and 42 in the long tank 16, while a further work carrier having a work unit designated A in FIGURES 10 and 11 is moved to a position above position 37 in the tank 16. After the elevator frame is lowered, work carriers having work units designated B through E at positions 38′, 39′, 40′ and 41′ are moved in the reverse direction to positions 38, 39, 40 and 41 as indicated in FIGURE 13 to provide a closer spacing between the work carriers at positions 37–41 than between work carriers at positions 41 and 42.

The carrier frames such as indicated at 75 in FIGURE 2 are freely movable along their loop guide tracks relative to each other and carry forward and reverse lugs 155 and 154 as seen in FIGURES 3 and 5 to enable movement of selected carrier frames relative to other of the carrier frames. Specifically, reverse lugs 154 shown in FIGURE 5 may be in an inactive position out of engageable relation with the conveyor pushers 130 except where activated by the control bar 300 at stations 38–41′ in FIGURE 1. Thus, as the conveyor chain moves in the reverse direction, only the lugs of carrier frames at positions 38′–41′ are engaged and actually moved in the reverse direction.

The electric control system makes provision for automatically cycling the machine including movement of the selected carrier guide frames in the reverse direction when the elevator frame reaches down position in each cycle.

Many modifications and variations may be effected without departing from the scope of the novel concepts of the present invention.

I claim as my invention:

1. In combination, a processing machine having a series of processing stations arranged in a loop, a series of work carriers, means mounting said work carriers for movement along said loop series of processing stations, and conveyor means for cyclically moving said work carriers in a forward direction in unison a first distance and for moving work carriers at predetermined processing stations in a reverse direction in each cycle a second distance less than said first distance while other of said work carriers are substantially stationary to provide for closer spacing of said work carriers in the region of said predetermined processing stations.

2. In combination in a processing machine, a series of carrier guide frames having work carriers vertically reciprocably carried thereby, means mounting said carrier guide frames for horizontal movement along a series of processing stations, means for moving said work carriers operatively associated with certain of said carrier guide frames from a lower position to an upper position relative thereto, conveyor means for advancing all of said carrier guide frames in a forward direction a first transfer distance with the work carriers of said certain guide frames in said upper position and for moving certain of the carrier guide frames in a reverse direction in each cycle of the machine a second distance less than said transfer distance while other of said carrier guide frames are substantially stationary to provide a reduced spacing of work carriers at one portion of the machine as compared to another portion of the machine.

3. In combination in a processing machine, a series of processing tanks including a multi-station tank extending along a given path, a series of work carriers operatively with said tanks and successively spaced from each other in the direction along said path with carriers operatively associated with adjacent tanks separated by a transfer distance in the direction along said path and with certain carriers at intermediate stations of the multi-station tank separated by a lesser distance along said path less than the transfer distance, means for raising work carriers to be transferred between tanks, means for moving all work carriers a distance in the forward direction along said path equal to the transfer distance to move the work carriers at intermediate stations of the multi-station tank past respective next intermediate stations in said multi-station tank, and means for moving work carriers which are beyond respective intermediate stations of the multi-station tank in the reverse direction along said path which is opposite to said forward direction along said path a distance equal to the difference between said transfer distance and said lesser distance in each cycle of operation of the machine to position said work carriers at the intermediate stations which are separated by said distance less than the transfer distance and thus to provide the reduced spacing between the work carriers at said intermediate stations of said multi-station tank.

4. In combination in a processing machine, a series of processing tanks including a multi-station tank arranged in a loop circuit, a series of carrier guide frames mounted for horizontal movement about a loop path past the successive tanks, work carriers vertically reciprocally carried by the carrier guide frames for movement from a lower position with the work associated therewith in an adjacent tank to an upper position with the work associated therewith clear of the ends of the tanks, said carrier guide frames being spaced a transfer distance in the direction along said path at certain portions of the machine and being spaced a lesser distance in the direction along said path at an intermediate portion of said multi-station tank, means for raising work carriers to upper position for transfer between tanks, means for moving said carrier guide frames the transfer distance in a forward direction along said path with the work carriers to be transferred in upper position to more carrier guide frames at said intermediate portion of said multi-station tank beyond the position just occupied by the next succeeding carrier guide frame in said intermediate portion, and means for moving carrier guide frames adjacent said intermediate portion of said multi-station tank in the reverse direction along said path which is opposite to said forward direction a distance equal to the difference between said transfer distance and said lesser distance after each advance of the carrier guide frames to accommodate the reduced spacing between said work carriers at said intermediate portion of said multi-station tank.

5. In combination in a processing machine for moving work units through a series of processing tanks including a multi-station processing tank, conveyor means for moving work carriers between successive stop positions including a series of stop positions operatively associated with the multi-station tank, carrier transfer means for moving the work carriers vertically during transfer between stop positions operatively associated with successive tanks, and an automatic control circuit responsive to raising of work carriers for transfer between stop positions associated with successive tanks to advance the work carriers a transfer distance between said stop positions by actuation of said conveyor means, said conveyor means moving work carriers at stop positions corresponding to the multi-station tank a transfer distance greater than the separation between said stop positions associated with the multi-station tanks, and said automatic control circuit being operative in each cycle of movement of the work carriers to move the work carriers which are beyond the stop positions of the multi-station tank in the reverse direction back to the respective stop positions.

6. In combination, a processing machine having a series of first stations successively spaced along a given path and a series of second stations spaced successively along said path beyond said first stations, the distance between said successive first stations being equal to a transfer distance, the distance between said second successive stations being equal to a lesser distance less than said transfer distance, horizontal conveyor means movable in a forward direction along said path to advance first work carriers said transfer distance in a forward direction along said path to respective first stations of said series of stations and to advance second work carriers said transfer distance in a forward direction along said path to respective second positions beyond respective second stations of said series of stations, and engageable with said second work carriers at said second positions during movement in a reverse direction along said path which is opposite to said forward direction to move said second carriers a distance equal to the difference between said transfer distance and said lesser distance back to said respective second stations and thus to provide a reduced spacing of said second carriers from said first carriers and a reduced spacing between the successive second stations as compared with the spacing between the successive first stations.

References Cited in the file of this patent

UNITED STATES PATENTS

| | | |
|---|---|---|
| 901,003 | Hennig | Oct. 13, 1908 |
| 2,591,681 | Davis | Apr. 8, 1952 |
| 2,650,600 | Davis | Sept. 1, 1953 |
| 2,869,560 | Finston | Jan. 20, 1959 |